US007565878B2

(12) United States Patent
Shearer et al.

(10) Patent No.: US 7,565,878 B2

(45) Date of Patent: Jul. 28, 2009

(54) INTEGRATED SCREW COVER/SEAL BOTTOM TRIM

(75) Inventors: Robert R. Shearer, Bradenton, FL (US); Edward J. Erskine, Benson, NY (US)

(73) Assignee: Taylor Made Group, Inc., Gloversville, NY (US)

(*) Notice: Subject to any disclaimer, the term of this patent is extended or adjusted under 35 U.S.C. 154(b) by 0 days.

(21) Appl. No.: 11/877,939

(22) Filed: Oct. 24, 2007

(65) Prior Publication Data

US 2008/0100074 A1 May 1, 2008

Related U.S. Application Data

(60) Provisional application No. 60/855,393, filed on Oct. 31, 2006.

(51) Int. Cl.
*B63B 17/00* (2006.01)

(52) U.S. Cl. ........................................ 114/361; 296/93

(58) Field of Classification Search ................. 114/343, 114/361, 364; 156/108, 291; 296/93, 96.21, 296/108, 146.9; 49/490.1, 498.1, 502; 52/456
See application file for complete search history.

(56) References Cited

U.S. PATENT DOCUMENTS

| | | | | |
|---|---|---|---|---|
| 2,716,529 | A * | 8/1955 | Waclaw | 244/121 |
| 3,093,844 | A * | 6/1963 | Brock et al. | 114/361 |
| 3,172,419 | A * | 3/1965 | Lewis | 114/361 |
| 3,416,833 | A | 12/1968 | Griffin | |
| 3,654,648 | A * | 4/1972 | Wilhoit | 114/361 |
| 3,967,424 | A | 7/1976 | Gates | |
| 3,978,535 | A | 9/1976 | Swan et al. | |
| 4,750,449 | A * | 6/1988 | Muhlberger | 114/361 |
| 4,815,410 | A | 3/1989 | Muhlberger | |
| 4,874,201 | A | 10/1989 | Scaglietti | |
| 5,054,242 | A | 10/1991 | Keys et al. | |
| 5,154,028 | A | 10/1992 | Hill et al. | |
| 5,586,798 | A | 12/1996 | Saegusa | |
| 5,601,050 | A * | 2/1997 | Erskine et al. | 114/361 |
| 5,711,119 | A | 1/1998 | Cornils et al. | |
| 5,804,018 | A | 9/1998 | Fisher et al. | |
| 5,815,997 | A | 10/1998 | Cornils et al. | |
| 5,839,388 | A | 11/1998 | Vadney | |
| 6,022,063 | A | 2/2000 | Frost et al. | |
| 6,022,065 | A | 2/2000 | Stopp et al. | |
| 6,241,304 | B1 | 6/2001 | Frost | |

(Continued)

FOREIGN PATENT DOCUMENTS

| | | |
|---|---|---|
| FR | 2 684 051 | 5/1993 |

*Primary Examiner*—Lars A Olson
(74) *Attorney, Agent, or Firm*—Nixon & Vanderhye P.C.

(57) ABSTRACT

A bottom trim member attaches a curved sheet to a surface. The bottom trim member includes a connecting part having a sheet receiving component that is configured to receive a bottom portion of the curved sheet, and a connecting leg extending in a downward direction relative to the curved sheet. A seal and cover member is attachable between the connecting leg and the surface and surrounding the connecting leg. With this construction, the seal and cover member serves to provide a moisture seal between the bottom trim member and the surface on which the trim member is mounted and serves to cover an area through which a fastening member can be placed to fix the trim member to the surface.

15 Claims, 1 Drawing Sheet

10

16

12

U.S. PATENT DOCUMENTS 6,453,841 B1 9/2002 Shearer et al.
6,800,160 B2 * 10/2004 Norman ...................... 114/361
6,895,885 B2 5/2005 Shearer et al.
7,281,486 B2 * 10/2007 Bach et al. .................. 114/361
7,434,533 B2 * 10/2008 Erskine et al. .............. 114/361

* cited by examiner

INTEGRATED SCREW COVER/SEAL BOTTOM TRIM

CROSS-REFERENCES TO RELATED APPLICATIONS

This application claims the benefit of U.S. Provisional Patent Application Ser. No. 60/855,393, filed Oct. 31, 2006, the entire content of which is herein incorporated by reference.

STATEMENT REGARDING FEDERALLY SPONSORED RESEARCH OR DEVELOPMENT (Not Applicable)

BACKGROUND OF THE INVENTION

The present invention relates to apparatus and methods for mounting a curved sheet element on a surface and, more particularly, to apparatus and methods for mounting a curved windshield on the deck of a boat. Use of the term "curved sheet" is intended to encompass a generally flat sheet with some curvature to the sheet wings and fronts.

Systems for mounting curved sheet elements to a surface, particularly mounting curved windshields to the deck of a boat, are known. One such mounting system includes an elongated member having upper, intermediate and lower portions wherein the upper portion comprises, in cross-section, a generally channel-shaped receptacle for receiving the lower edge of the curved windshield. The lower portion includes a flat which extends from the intermediate portion at an angle of approximately 45° relative to the base of the channel-shaped upper portion. The intermediate portion includes angularly related portions connected along one edge intermediate of and to the base of the channel while the other angularly related portion extends rearwardly for connection with the flat. The forward portion of the flat terminates in a free edge defining a receptacle for receiving the trim piece with the base of the channel, the intermediate portion and the inside surface of the flat.

In using such a mounting system, it is necessary to bend the elongated member to conform it to the curvature of the lower edge of the glass. In bending the member, however, twisting also occurs, causing the flat to stand up from the deck. That is, the flat will not maintain a flush continuous contact with the deck over the full length of the member. Additionally, the mounting member is secured to the deck by screws disposed through the flat. The compound curvature of the mounting member, however, makes it difficult to mount the screws and secure the mounting member and windshield to the deck. Even after such securement, gaps appear between the mounting member and the deck.

In an improvement to this mounting system, another system described in U.S. Pat. No. 4,815,410 (the contents of which are incorporated by reference) provides a continuous flush contact between the mounting member and the boat deck surface throughout the entire length of the mounting member while simultaneously facilitating mounting of the windshield to the deck. To accomplish this, there is provided an elongated member having upper and lower portions connected one to the other by an intermediate portion. The upper portion is preferably generally channel-shaped in cross-section for receiving the lower edge of the curved sheet element. The intermediate portion extends along one side of the member and from the channel-shaped upper portion toward the lower portion.

It will be appreciated that, in the case of a curved glass windshield for a boat, the curvature of the windshield necessitates different angles of inclination between the windshield and deck at various locations along the windshield. For example, the angle between the windshield and the deck at the forwardmost portion of the windshield may be about 30-35 degrees. At the sides of the windshield adjacent the corners and the locations of greatest curvature, such angle may be 75-80 degrees. In bending and twisting the mounting member to accommodate the compound curvature of the windshield along its lowermost edge, the arcuate lower portion of the mounting member permits continuous flush contact without gaps between the mounting member and the flat deck throughout the length of the member as it curves from the front of the windshield around its corners to the sides of the windshield. That is, an edge or line contact between the arcuate section of the mounting member and the deck is maintained. Because of the compound curvature of the mounting member, however, such contact is at different arcuate or circumferential positions along the arcuate lower portion of the member.

SUMMARY OF THE INVENTION

After securing the conventional system in place, it is necessary to provide a seal to prevent moisture from reaching the hull, and it is also necessary to cover the fastening structure. It would be desirable to integrate the bottom seal and fastener cover.

In an exemplary embodiment, a bottom trim member attaches a curved sheet to a surface. The bottom trim member includes a connecting part having a sheet receiving component such as a channel or surface that is configured to receive the curved sheet, and a connecting leg extending in a downward direction relative to the opening direction of the sheet receiving component. A seal and cover member is attachable between the connecting leg and the surface and surrounding the connecting leg. In one embodiment, the connecting leg comprises a curved shape so that the bottom trim member is attachable to the surface at multiple angular orientations.

The connecting part may further include an interim channel disposed between the sheet receiving component and the connecting leg, where the interim channel is shaped to receive a fastener.

The connecting part may further include a seal member receiving channel and a hook member disposed on opposite sides of the connecting leg, where the seal member receiving channel and the hook member are shaped to receive opposite ends of the seal and cover member. In this context, the seal and cover member may include an attaching plug at one end attachable to the seal member receiving channel, and a hook at an opposite end attachable to the hook member. Preferably, the seal and cover member is formed of one of a rubber material, vinyl, Santoprene, silicone, foam, and the like or combinations of these materials or these and other materials.

In one arrangement, at least a portion of the seal and cover member comprises a two-layer structure.

In another exemplary embodiment, a bottom trim member supports a windshield and is securable to a boat hull via a fastener. The bottom trim member includes a connecting part including a support member such as an upwardly extending channel that receives the windshield and a downwardly extending connector leg through which the fastener is attached to secure the bottom trim member to the boat hull. A seal and cover member is attachable between the connecting part and the boat hull to thereby provide a seal. The seal and cover member extends across the connector leg and covers the fastener.

In yet another exemplary embodiment, a method of securing a bottom trim member for supporting a windshield to a boat hull includes the steps of (a) attaching one end of the seal and cover member; (b) positioning the connecting part against the boat hull and adjusting an orientation of the connecting part according to the windshield angle; (c) extending a fastening member through the connector leg and the seal and cover member to secure the connecting part to the boat hull; and (d) attaching an opposite end of the seal and cover member to an opposite side of the connector leg from the one end of the seal and cover member, thereby covering the fastening member.

BRIEF DESCRIPTION OF THE DRAWINGS

These and other aspects and advantages will be described in detail with reference to the accompanying drawings, in which.

DETAILED DESCRIPTION OF THE INVENTION

The present invention provides a bottom trim member that includes an integrated fastener cover and seal. In this manner, installation requires fewer assembly steps, thereby reducing installation costs.

Figure 1:
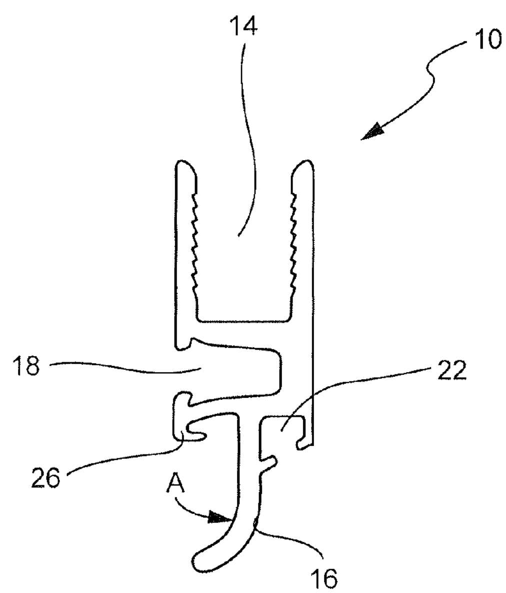
FIG. 1 shows the connecting part of a bottom trim member according to a described embodiment.
Figure 2:
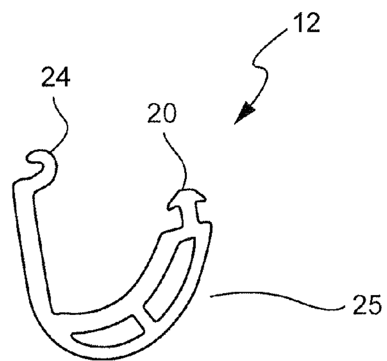
FIG. 2 shows an integrated seal/cover member cooperable with the connecting part shown in FIG. 1.
Figure 3:
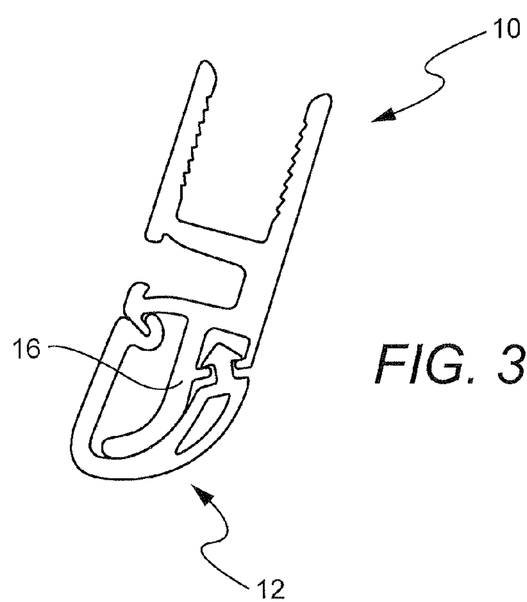
FIG. 3 shows the bottom trim member with the integrated seal/cover member secured to the connecting part.

With reference to FIGS. 1 and 2, the trim member of the invention includes a connecting part 10 (shown in FIG. 1) and an integrated seal/cover member 12 (shown in FIG. 2). The connecting part 10 includes an upwardly extending windshield receiving channel 14 preferably having serrated sidewalls as is conventional. A downwardly extending connecting leg 16 extends from a bottom portion of the connecting part 10 and is of generally a curved or J-shape construction. The connecting leg 16 is secured to a boat hull via a suitable fastener such as a screw or the like extending through an inside surface of the connecting leg 16 (see, for example, arrow A in FIG. 1). The curved part of the connecting leg 16 enables the connecting part 10 to be set in a suitable position to accommodate any windshield angle prior to being secured to the boat hull.

The connecting part 10 also includes an interim channel 18 that receives a fastener or the like for securing a boat cover or the like as described in, for example, U.S. Pat. Nos. 6,453,841, 6,895,885, and with a top trim member in U.S. Pat. No. 5,839,388, the contents of all of which are hereby incorporated by reference.

The integrated member 12 is generally formed of a rubber material, although other materials, such as vinyl, Santoprene, silicone, foam, etc. may be used as well as combinations of these materials or these and other materials. The integrated member 12 includes an attaching plug 20 at one end thereof that is sized to fit within a receiving channel 22 of the connecting part 10. The integrated member 12 also includes a hook end 24 selectively securable to a correspondingly sized hook 26 on the connecting part 10. At least a portion 25 of the integrated member 12 may be provided with a two-layer multi-cell construction as shown in FIG. 2. That is, an upper and lower wall may outline a cavity of the hollow section of the seal. The hollow is not a requirement of the construction, but it does provide a shaped flexible area that fills the areas around contact between the deck and the trim. The hollow section could be non-existent, a single hollow, or a multi-hollow depending on the application.

To install the trim member to a boat hull, the attaching plug 20 is first secured in the receiving channel 22, and the trim member is positioned against the hull and adjusted according to the windshield angle. Once the unit is properly positioned, a fastening member is extended through the connecting leg 16 and the integrated member 12 into the boat hull. The integrated member 12 is then folded up and over the connecting leg 16 so that its hook end 24 is secured to the hook 26 of the connecting part 10. In this manner, the integrated member 12 thus not only provides a seal between the connecting part 10 and the boat hull, but also provides a means to cover the fastener after securing the unit to the boat hull.

The bottom trim member provides an effective and attractive seal assembly. The cover design additionally decreases the chances of water draining off of the windshield and into the windshield fastening area where, if water is present, may lead to galvanic corrosion between the fastener and the trim. Since there is no exposed lower lip on the bottom trim, water has the tendency to drain off of the seal and onto the deck. In addition, standing water within this area could eventually find its way into the boat deck by following the threads of the fastener through the hole.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A bottom trim member for attaching a curved sheet to a surface, the bottom trim member comprising:

a connecting part including a sheet receiving component that is configured to receive a bottom portion of the curved sheet, and a connecting leg extending in a downward direction relative to the curved sheet; and a seal and cover member attachable between the connecting leg and the surface and surrounding the connecting leg, wherein the seal and cover member is sized and positioned to provide a seal between the connecting part and the surface and to cover a fastener that secures the connecting part to the surface.

2. A bottom trim member according to claim 1, wherein the connecting leg comprises a curved shape so that the bottom trim member is attachable to the surface at multiple angular orientations.

3. A bottom trim member according to claim 1, wherein the connecting part further comprises an interim channel disposed between the sheet receiving component and the connecting leg, the interim channel being shaped to receive a fastener.

4. A bottom trim member according to claim 1, wherein the connecting part further comprises a seal member receiving channel and a hook member disposed on opposite sides of the connecting leg, wherein the seal member receiving channel and the hook member are shaped to receive opposite ends of the seal and cover member.

5. A bottom trim member according to claim 4, wherein the seal and cover member comprises:

an attaching plug at one end attachable to the seal member receiving channel; and a hook at an opposite end attachable to the hook member.

6. A bottom trim member according to claim 1, wherein the seal and cover member is formed of one of a rubber material, vinyl, Santoprene, silicone, foam, combinations thereof, and combinations thereof with alternative materials.

7. A bottom trim member according to claim 1, wherein the seal and cover member comprises:

an attaching plug at one end attachable to the connecting part on one side of the connecting leg; and a hook at an opposite end attachable to the connecting part on an opposite side of the connecting leg.

8. A bottom trim member according to claim 1, wherein at least a portion of the seal and cover member comprises a two-layer structure.

9. A windshield assembly comprising a windshield attachable to a boat hull via the bottom trim member of claim 1.

10. A bottom trim member supporting a windshield and securable to a boat hull via a fastener, the bottom trim member comprising:

a connecting part including a support member that receives the windshield and a downwardly extending connector leg through which the fastener is attached to secure the bottom trim member to the boat hull; and a seal and cover member attachable between the connecting part and the boat hull to thereby provide a seal, the seal and cover member extending across the connector leg and covering the fastener.

11. A bottom trim member according to claim 10, wherein the connecting leg comprises a curved shape so that the bottom trim member is attachable to the surface at multiple angular orientations.

12. A bottom trim member according to claim 10, wherein the seal and cover member comprises:

an attaching plug at one end attachable to the connecting part on one side of the connecting leg; and a hook at an opposite end attachable to the connecting part on an opposite side of the connecting leg.

13. A bottom trim member according to claim 10, wherein the seal and cover member is attached at one end to the connecting part on one side of the connector leg and is attached at its other end to the connecting part on an opposite side of the connector leg such that the seal and cover member surrounds the connector leg.

14. A method of securing a bottom trim member for supporting a windshield to a boat hull, the bottom trim member including a connecting part having a windshield receiving component and a connecting leg, and a seal and cover member, the method comprising:

(a) attaching one end of the seal and cover member;

(b) positioning the connecting part against the boat hull and adjusting an orientation of the connecting part according to a windshield angle;

(c) extending a fastening member through the connector leg and the seal and cover member to secure the connecting part to the boat hull; and (d) attaching an opposite end of the seal and cover member on an opposite side of the connector leg from the one end of the seal and cover member, thereby covering the fastening member.

15. A method according to claim 14, wherein the connecting part further includes a seal member receiving channel and a hook member disposed on opposite sides of the connecting leg, wherein the seal and cover member further includes an attaching plug at one end and a hook at an opposite end, and wherein step (a) is practiced by securing the attaching plug in the seal member receiving channel and step (d) is practiced by securing the hook member on the hook.

* * * * *